United States Patent
Hiyama et al.

(10) Patent No.: US 8,767,137 B2
(45) Date of Patent: Jul. 1, 2014

(54) LIQUID CRYSTAL DISPLAY DEVICE WITH RED, GREEN AND BLUE SUBPIXELS HAVING DIFFERENT APERTURE RATIOS

(75) Inventors: Ikuo Hiyama, Hitachinaka (JP); Kentaro Ojima, Chiba (JP); Masahiro Ishii, Mobara (JP); Shisei Katou, Mobara (JP); Yoshiro Mikami, Hitachiota (JP)

(73) Assignee: Japan Display Inc., Tokyo (JP)

( * ) Notice: Subject to any disclaimer, the term of this patent is extended or adjusted under 35 U.S.C. 154(b) by 221 days.

(21) Appl. No.: 13/015,807

(22) Filed: Jan. 28, 2011

(65) Prior Publication Data

US 2011/0187953 A1    Aug. 4, 2011

(30) Foreign Application Priority Data

Jan. 29, 2010  (JP) ................................ 2010-018299

(51) Int. Cl.
*G02F 1/136* (2006.01)
*G02F 1/1335* (2006.01)
*G02F 1/1343* (2006.01)
*F21V 7/04* (2006.01)

(52) U.S. Cl.
USPC ................... 349/46; 349/43; 349/48; 349/70; 349/109; 349/141; 349/142; 349/144; 362/614

(58) Field of Classification Search
USPC ........... 349/48, 70, 109, 142, 144, 42, 43, 46, 349/106, 108, 139, 141, 143; 362/614
See application file for complete search history.

(56) References Cited

U.S. PATENT DOCUMENTS

| 5,235,448 | A  | * | 8/1993  | Suzuki et al. | .............. | 349/43 |
| 7,091,936 | B1 |   | 8/2006  | Yamada |  |  |
| 7,133,093 | B2 | * | 11/2006 | Ochiai et al. | ............... | 349/70 |
| 2009/0091235 | A1 | * | 4/2009 | Matsuo et al. | ............. | 313/486 |
| 2009/0109358 | A1 | * | 4/2009 | Tanaka et al. | .............. | 349/38 |

FOREIGN PATENT DOCUMENTS

| JP | 2000-162627 | 6/2000 |
| JP | 2000-187231 | 7/2000 |
| JP | 2001-109399 | 4/2001 |
| JP | 2002-350830 | 12/2002 |
| JP | 2003-050388 | 2/2003 |
| JP | 2009-109820 | 5/2009 |

* cited by examiner

*Primary Examiner* — Lucy Chien
*Assistant Examiner* — Paisley L Arendt
(74) *Attorney, Agent, or Firm* — Antonelli, Terry, Stout & Kraus, LLP.

(57) ABSTRACT

In a liquid crystal display device, the reduction of power consumption is realized by reddening a backlight while maintaining a white balance. An aperture ratio of a red subpixel and an aperture ratio of a blue subpixel are set such that, in a state where an aperture ratio of a green subpixel in each pixel of a liquid crystal panel is fixed to a desired value, white brightness efficiency takes a maximum value which is set based on a balance between light emission efficiency which is increased corresponding to lowering of a color temperature of the backlight and transmissivity of the pixel which is decreased corresponding to the increase of the aperture ratio of the blue subpixel.

3 Claims, 5 Drawing Sheets

LIQUID CRYSTAL DISPLAY DEVICE WITH RED, GREEN AND BLUE SUBPIXELS HAVING DIFFERENT APERTURE RATIOS

CROSS-REFERENCE TO RELATED APPLICATION

The present application claims priority from Japanese application JP 2010-018299 filed on Jan. 29, 2010, the content of which is hereby incorporated by reference into this application.

BACKGROUND OF THE INVENTION

1. Field of the Invention

The present invention relates to a liquid crystal display device, and more particularly to a liquid crystal module including a liquid crystal panel and a backlight.

2. Description of the Related Art

Recently, along with the increase of interest among people on environmental problems, there has been a demand for electric appliances of low power consumption. A liquid crystal television receiver set is not an exception. In a liquid crystal module which constitutes a display part of a liquid crystal display device such as a liquid crystal television receiver set, most of power is consumed by a backlight. Accordingly, in an attempt to reduce power consumption, the enhancement of light emission efficiency of the backlight per se and the enhancement of transmissivity of the liquid crystal panel are effective.

In this respect, JP 2000-187231 A discloses a technique which enhances the light emission efficiency of a backlight by lowering color temperature of the back light. JP 2000-187231 A also discloses that when the aperture ratio of a blue subpixel is set larger than the aperture ratios of other subpixels among red, green and blue subpixels which constitute each pixel of the liquid crystal panel, a favorable white balance can be acquired due to lowering of color temperature of the backlight. JP 2000-187231 A also discloses that the liquid crystal panel has a weak transmissivity for the blue light.

In reducing the power consumption of the backlight by lowering a color temperature, when the aperture ratio of the blue subpixel is increased to acquire the white balance, the transmissivity of the liquid crystal panel is lowered as a whole. Accordingly, in an attempt to acquire desired white brightness, due to a trade-off between the enhancement of the light emission efficiency of the backlight and the lowering of transmissivity of the liquid crystal panel, there exists a drawback that it is not always possible to acquire the desired reduction of power consumption and the desired white display.

SUMMARY OF THE INVENTION

The present invention has been made to overcome such drawbacks, and it is an object of the present invention to provide a liquid crystal display device which can properly reduce power consumption and can perform a proper display.

According to one aspect of the present invention, there is provided a liquid crystal display device which includes: a light source which generates an irradiation light; and a liquid crystal panel which includes a liquid crystal layer which is sandwiched between a pair of substrates, the liquid crystal panel being provided pixels, each consisting of red, green and blue subpixels, and controlling the transmission of the irradiation light at each of the subpixels, wherein aperture ratios of the red subpixel and the blue subpixel in the each pixel of the liquid crystal panel are determined such that, in a state where the aperture ratio of the green subpixel is fixed to a desired value, white brightness efficiency takes a maximum value which is set based on a balance between light emission efficiency which is increased corresponding to lowering of color temperature of the light source and transmissivity of the pixel which is decreased corresponding to the increase of the aperture ratio of the blue subpixel.

According to another aspect of the present invention, there is provided a liquid crystal display device which includes: a light source which is constituted of a cold cathode fluorescent lamp which uses $Y_2O_3:Eu^{3+}$ as a red phosphor, $LaPO_4:Tb^{3+}$ as a green phosphor and $(Sr, Ca)_{10}(PO_4)_6Cl_2:Eu^{2+}$ as a blue phosphor respectively and generates an irradiation light; and a liquid crystal panel which includes a liquid crystal layer which is sandwiched between a pair of substrates, the liquid crystal panel being provided pixels, each consisting of red, green and blue subpixels, and controlling the transmission of the irradiation light at each of the subpixels, wherein a ratio among aperture ratios of the red subpixel, the green subpixel and the blue subpixel in the each pixel of the liquid crystal panel is set to 0.6:1.1:1.3, and a color temperature of the light source is set such that the pixel is displayed in white.

According to still another aspect of the present invention, the above-mentioned liquid crystal display device adopts an active-matrix drive method in which each subpixel includes a thin film transistor which connects an individual electrode arranged in the subpixel to a signal line in response to a control voltage applied to a gate of the thin film transistor from a scanning line, and a size of the thin film transistor which is defined by a ratio W/L between a gate width W and a gate length L is set such that a ratio of the size of the thin film transistor among the red subpixel, the green subpixel and the blue subpixel takes a value corresponding to the ratio among the aperture ratios.

According to the liquid crystal display device of the present invention, the power consumption can be properly reduced and proper white balance and proper driving of pixels can be realized.

DETAILED DESCRIPTION OF THE INVENTION

Hereinafter, an embodiment according to the present invention is explained in conjunction with attached drawings.

Figure 1:
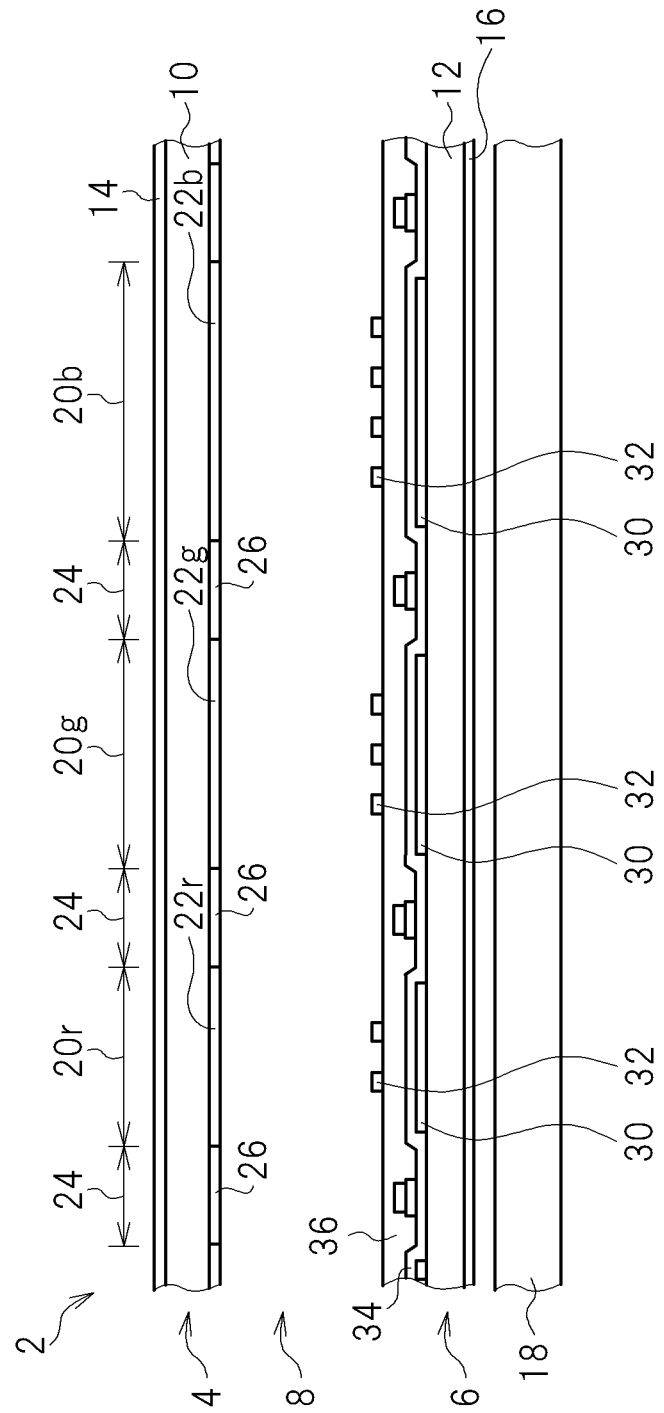
FIG. 1 is a schematic cross-sectional view of a liquid crystal display device according to an embodiment of the present invention.

FIG. 1 is a schematic cross-sectional view of a liquid crystal display device 2 according to this embodiment. The liquid crystal display device 2 is an IPS (In Plane Switching) and active-matrix-driving liquid crystal display device, wherein liquid crystal 8 is filled between a color filter substrate 4 and a TFT (Thin Film Transistor) substrate 6. Polarizing films 14, 16 are adhered to outer surfaces of glass substrates 10, 12 which constitute the color filter substrate 4 and the TFT substrate 6 respectively. A backlight 18 is arranged in a state where the backlight 18 faces a surface of the polarizing film 16 of the TFT substrate 6. FIG. 1 is the cross-sectional view along the horizontal direction (row direction) of an image.

Each pixel is formed of a set of red, green and blue subpixels 20r, 20g, 20b. On the color filter substrate 4, a red film 22r, a green film 22g and a blue film 22b which are color filter films are formed corresponding to the subpixels of respective colors. A black matrix area 24 is formed between the subpixels of different colors, and a light blocking film 26 formed of a black film or the like, for example, is formed in the area.

Further, the TFT substrate 6 is provided with common electrodes 30, pixel electrodes 32 which constitute individual electrodes for respective subpixels, lines which are connected to these electrodes 30, 32, TFTs (not shown in the drawings) and the like which are formed on the glass substrate 12. The common electrode 30 made of a transparent electrode material is arranged corresponding to each pixel area, and a predetermined common potential (reference potential) is applied to the common electrode 30 via a common electrode line. The pixel electrode 32 is connected to a signal line via the TFT so that an image signal is applied to the pixel electrode 32. The common electrode 30 and the pixel electrode 32 generate an electric field having a lateral component in the liquid crystal 8 due to the potential difference between these electrodes 30, 32 so that the orientation direction of the liquid crystal 8 is changed whereby the liquid crystal 8 is driven. The common electrode 30 and the pixel electrode 32 are insulated from each other by insulation layers 34, 36.

Although not shown in the drawing, the liquid crystal display device 2 is also provided with orientation films and photo spacers. Further, the liquid crystal display device 2 may be also provided with an overcoat layer and various optical films when necessary.

Figure 2:
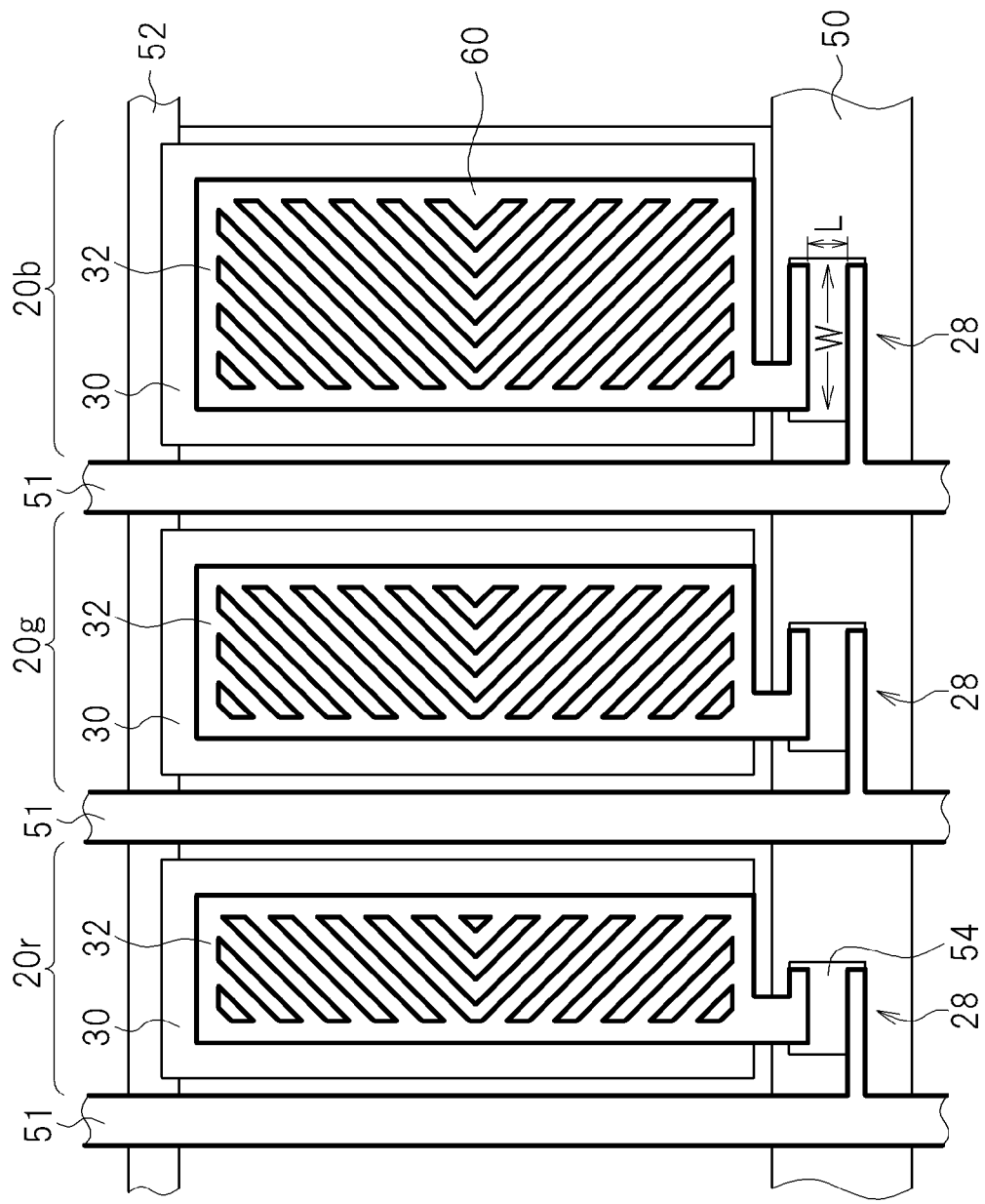
FIG. 2 is a schematic plan view for explaining the structure of a pixel in the liquid crystal display device according to the embodiment of the present invention.

FIG. 2 is a schematic plan view for explaining the structure of the pixel according to the liquid crystal display device 2 of this embodiment. FIG. 2 shows the structure of the pixel relating to the TFT substrate 6, wherein besides the common electrode 30, the pixel electrode 32 and the TFT 28, a scanning line 50 which is arranged in the row direction, signal lines 51 which are arranged in the column direction and the common electrode line 52 are described in the drawing.

FIG. 2 shows the pixel structure where out of three subpixels 20r, 20g, 20b, the blue subpixel 20b has the largest aperture ratio, the green subpixel 20g has the second largest aperture ratio, and the red subpixel 20r has the smallest aperture ratio. This structure is described later.

A source electrode of the TFT 28 is connected to the pixel electrode 32, a drain electrode of the TFT 28 is connected to the signal line 51, and a gate electrode of the TFT 28 is connected to the scanning line 50. An amorphous silicon film 54 is formed as a channel between the source electrode and the drain electrode. With respect to a size of the TFT 28 which is expressed by a ratio W/L between a gate width W and a gate length L, the TFT 28 provided to the blue subpixel 20b is largest, the TFT 28 provided to the green subpixel 20g is second largest, and the TFT 28 provided to the red subpixel 20r is smallest. This structure is also described later.

The common electrode 30 has a shape corresponding to an opening portion of the pixel, and is arranged over the substantially whole opening portion. The pixel electrode 32 is formed into a shape having a plurality of stripe portions (comb-teeth portions), and is arranged between the common electrode 30 and the liquid crystal 8. The stripe portions of the pixel electrode 32 extend in an inclined manner with respect to the horizontal direction and the vertical direction of a screen. The inclination direction is changed between an upper half area and a lower half area of the pixel, and the inclination direction of the stripe portions in the upper area and the inclination direction of the stripe portions in the lower area are set symmetrical with respect to the horizontal direction of the screen, for example. The respective stripe portions in the pixel are connected with each other at respective end portions thereof thus forming the integral pixel electrode 32. The pixel electrode 32 and the common electrode 30 apply a capacity 60 to the source electrode of the TFT 28. The capacity 60 is charged in response to an image signal voltage applied to the signal line 51, and holds a potential of the pixel electrode 32 with respect to the common electrode 30 at a value corresponding to an image signal voltage.

Figure 3:
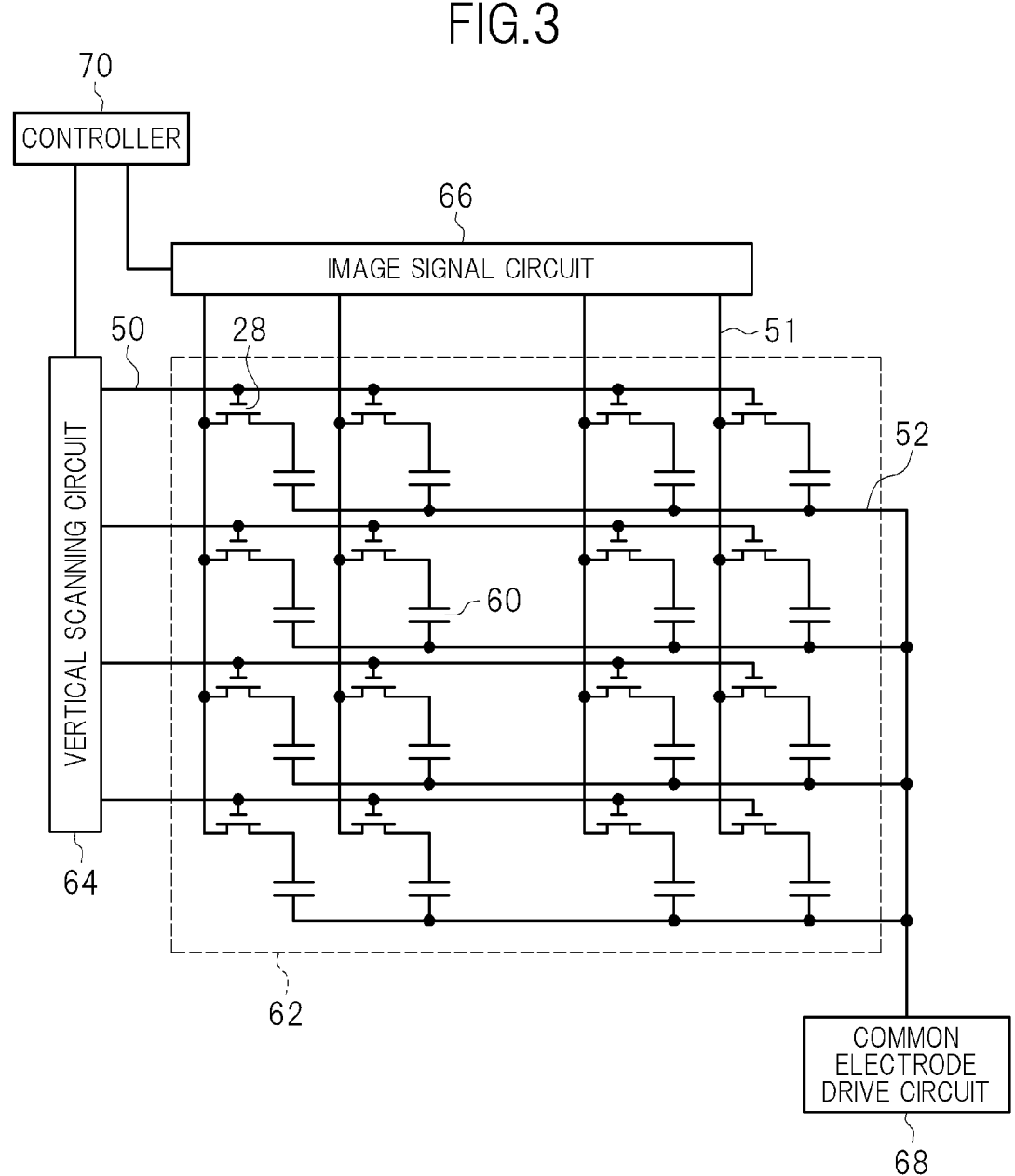
FIG. 3 is a schematic circuit diagram of a liquid crystal panel and drive circuits of the liquid crystal display device.

FIG. 3 is a schematic circuit diagram of the liquid crystal panel and drive circuits of the liquid crystal display device 2. An active-matrix-type liquid crystal display part 62 is provided with the plurality of scanning lines 50 and the plurality of common electrode lines 52 which extend in the row direction, and the plurality of signal lines 51 which extend in the column direction. The TFT 28 of each subpixel is connected to the scanning line 50 and the signal line 51 as described above. A vertical scanning circuit 64, an image signal circuit 66 and a common electrode drive circuit 68 are connected to the liquid crystal display part 62. The circuits 64, 66, 68 are formed of an LSI (large-scale integration) circuit respectively. To be more specific, the circuits 64, 66, 68 are connected to the above-mentioned various lines 50, 51, 52 mounted on the TFT substrate 6. The liquid crystal display part 62 performs a display operation by active matrix driving with the supply of scanning signal voltage, an image signal voltage and a timing signal from a power source circuit (not shown in the drawing) and a controller 70.

As described previously, in the liquid crystal display device 2, the area of the blue subpixel 20b is set larger than the areas of other subpixels. The reason that such structure is adopted is explained hereinafter.

A display mode effectively applicable to the liquid crystal display device 2 adopting an IPS drive method in which the orientation of liquid crystal is controlled by applying a lateral electric field to the liquid crystal is a birefringence mode and hence, the transmissivity T is expressed by a following formula in general.

$$T = T_0 \cdot \sin^2 2\theta \cdot \sin^2[(\pi \cdot \text{deff} \cdot \Delta n)/\lambda] \quad (1)$$

Here, $T_0$ indicates a coefficient having a value which is mainly determined based on the transmissivity of a polarizing film used in a liquid crystal display element, $\theta$ indicates an angle made by effective light axis and polarized light transmission axis of a liquid crystal layer, deff indicates an effective thickness of the liquid crystal layer, $\Delta n$ indicates refractive index anisotropy of liquid crystal, and $\lambda$ is a wavelength of light.

A product of the effective thickness deff of the liquid crystal layer and the refractive index anisotropy $\Delta n$ of liquid crystal, that is, deff·$\Delta n$ is referred to as retardation. As can be understood from the above-mentioned formula (1), the transmissivity of the liquid crystal display part 62 takes the maximum value at a specified wavelength (peak wavelength), and this peak wavelength depends on the retardation, that is, the value of the thickness deff of the liquid crystal layer and the value of the refractive index anisotropy $\Delta n$ of liquid crystal. Accordingly, when a white light is irradiated to the liquid crystal display part in a state that the aperture ratios of the respective red, green and blue subpixels are equal, a display tinted with color having a main wavelength in the vicinity of the peak wavelength is performed.

One preferred setting to cope with such a characteristic is to set the peak wavelength to 555 nm which is the maximum wavelength of luminosity factor. That is, it is preferable to set the thickness of the liquid crystal layer such that a condition of $(\pi \text{deff} \cdot \Delta n)/555]=\pi/2$ is satisfied.

Here, the transmissivity T is sharply decreased on a wavelength side shorter than the peak wavelength (555 nm) and is gradually decreased on a wavelength side longer than the peak wavelength (555 nm). That is, the transmissivity T of the blue subpixel becomes lower than the transmissivities T of other subpixels.

On the other hand, a cold cathode fluorescent lamp (CCFL) used in the backlight 18 has a tendency that the brightness is increased along with lowering of color temperature within a color temperature range where the cold cathode fluorescent lamp is usually used. That is, a warm-colored fluorescent tube can obtain the same brightness as a cold-colored fluorescent tube with the power consumption smaller than the power consumption of the cold-colored fluorescent tube. In general, assuming the power consumption of the fluorescent tube at a color temperature of 6000K as 100%, the power consumption necessary for acquiring the same brightness becomes 105% at a color temperature of 8000K, 110% at a color temperature of 10000K, and 95% at a color temperature of 4000K.

That is, with respect to the compensation for low transmissivity T of the blue subpixel relative to transmissivities T of other subpixels, compared to the compensation for low transmissivity T by bluing (coloring in cold color) in which a blue component of the backlight 18 is increased in a relative manner, the compensation for low transmissivity T of the blue subpixel by making an aperture ratio of the blue subpixel larger than an aperture ratio of the red subpixel consumes less power. Based on such understanding, the aperture ratio of the blue subpixel is set larger than the aperture ratio of other subpixels in the liquid crystal display device 2.

The intensities of respective components of red, green and blue in the backlight 18 can be adjusted by changing kinds of phosphors or by changing a mixing ratio of phosphors. In the case of a narrow-band light emitting fluorescent tube, the blue component has intensity corresponding to an amount of phosphor having a light emission peak at 430 to 470 nm, the green component has intensity corresponding to an amount of phosphor having a light emission peak at 540 to 550 nm, and the red component has intensity corresponding to an amount of phosphor having a light emission peak in the vicinity of 610 nm, and the relative intensity of the light emission peak corresponding to each color component is controlled by changing a mixing ratio of these phosphors so that fluorescent tubes having various color temperatures can be realized.

When reddening (coloring in warm color) of the backlight 18 is further advanced while maintaining the white balance by increasing the aperture ratio of the blue subpixel, it may be considered that the power consumption necessary for acquiring the predetermined white brightness is monotonously decreased. However, in an actual operation, there exists a minimum point in a change of power consumption caused by the increase of the aperture ratio of the blue subpixel and the reddening of the backlight. That is, there exists a condition which maximizes the white brightness efficiency. This condition is explained hereinafter.

Figure 4:
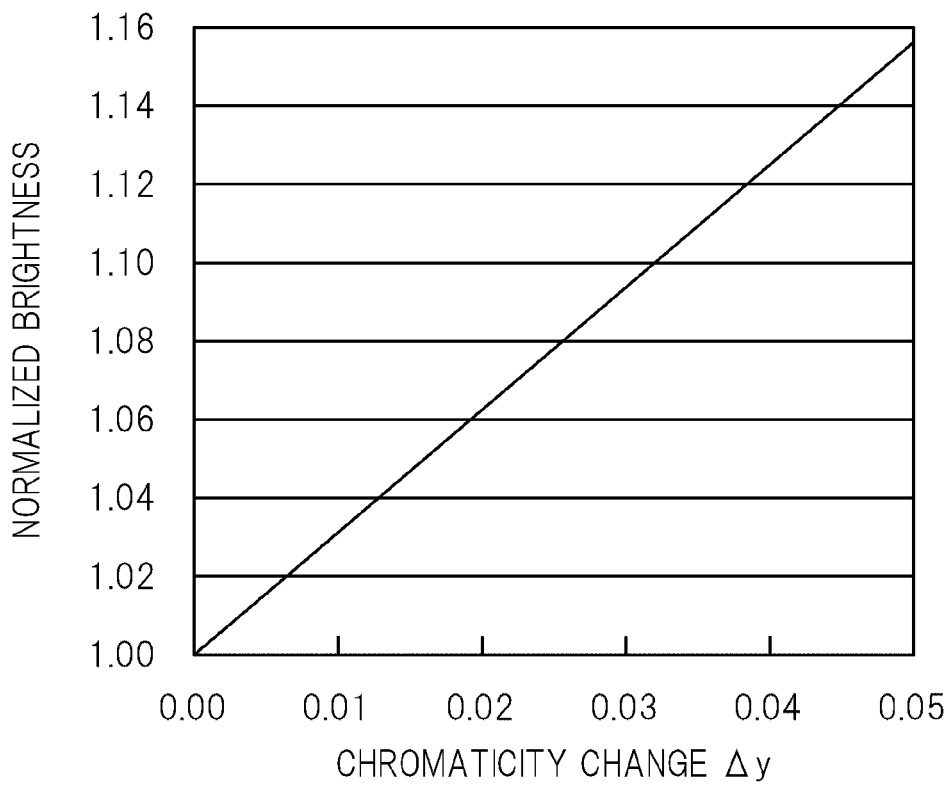
FIG. 4 is a graph showing the relationship between a change of chromaticity of a backlight and normalized brightness of the backlight.

FIG. 4 is a graph showing the relationship between a change of chromaticity of the backlight and the normalized brightness of the backlight. A change amount $\Delta y$ of a y coordinate of color temperature in an xy chromaticity diagram is taken on an axis of abscissas in FIG. 4, wherein a predetermined color temperature is set as the reference and the change amount $\Delta y$ expresses a change amount of color temperature from the y coordinate of the reference color temperature. A value which is obtained by normalizing the brightness of the backlight under a condition where power is fixed with the brightness at the above-mentioned reference color temperature is taken on an axis of ordinates. This graph is obtained by measuring the brightness and the chromaticity with respect to a plurality of backlights which differ from each other in a mixing ratio of phosphors, and by performing a regression analysis of obtained measured points. The graph shows that along with reddening of a light emitted from the backlight caused by the increase of $\Delta y$, the brightness is increased even when power is fixed.

Figure 5:
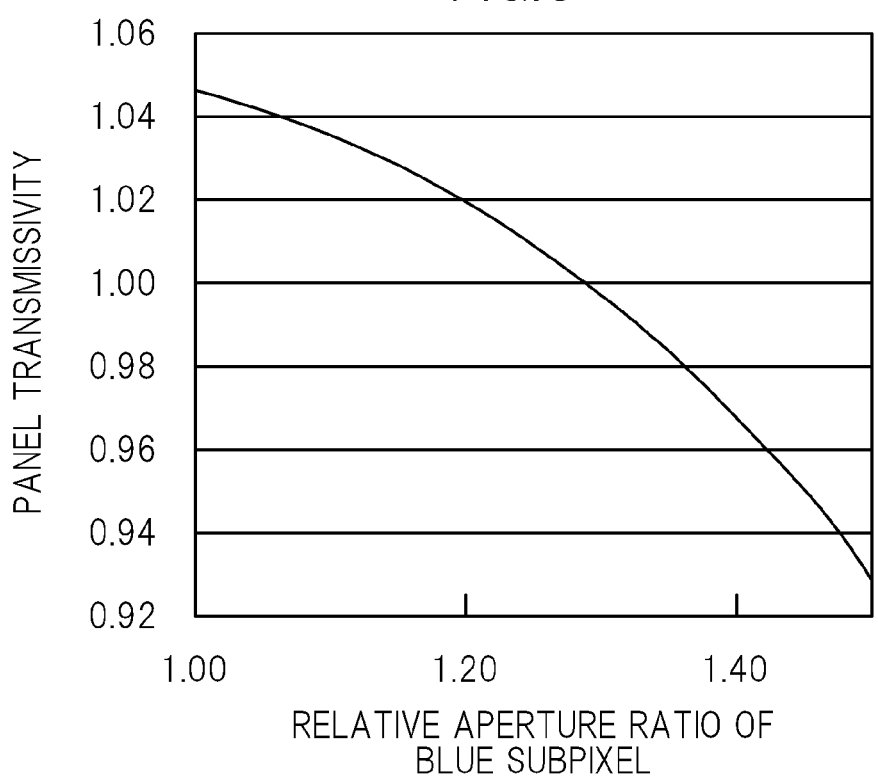
FIG. 5 is a graph showing the relationship between a relative aperture ratio of a blue subpixel and panel transmissivity.

FIG. 5 is a graph showing the relationship between a relative aperture ratio of the blue subpixel 20b and transmissivity of the liquid crystal display part 62 (panel transmissivity). On an axis of abscissas shown in FIG. 5, an aperture ratio $a_B$ of the blue subpixel 20b when an aperture ratio $a_G$ of the green subpixel 20g is set to 1.1 is taken. An aperture ratio $a_R$ of the red subpixel is set to $a_R$ $(=3-a_G-a_B)$. On an axis of ordinates in FIG. 5, the transmissivity of the panel formed of the red subpixel 20r, the green subpixel 20g and the blue subpixel 20b is taken as a relative value with reference to the transmissivity at the predetermined aperture ratio $a_B$. The panel transmissivity is the white brightness transmissivity, and is a ratio of the panel brightness relative to the backlight brightness in a state where the respective red, green and blue components of the backlight are adjusted so as to realize the white balance on a panel screen. As described previously, the transmissivity T of the blue subpixel 20b is lower than transmissivities T of other subpixels. Accordingly, when an area of the blue subpixel 20b is increased so that an area of the red subpixel 20r is decreased by a corresponding amount, the panel transmissivity is lowered, and the inclination of lowering of the transmissivity is increased along with the increase of the aperture ratio $a_B$.

Figure 6:
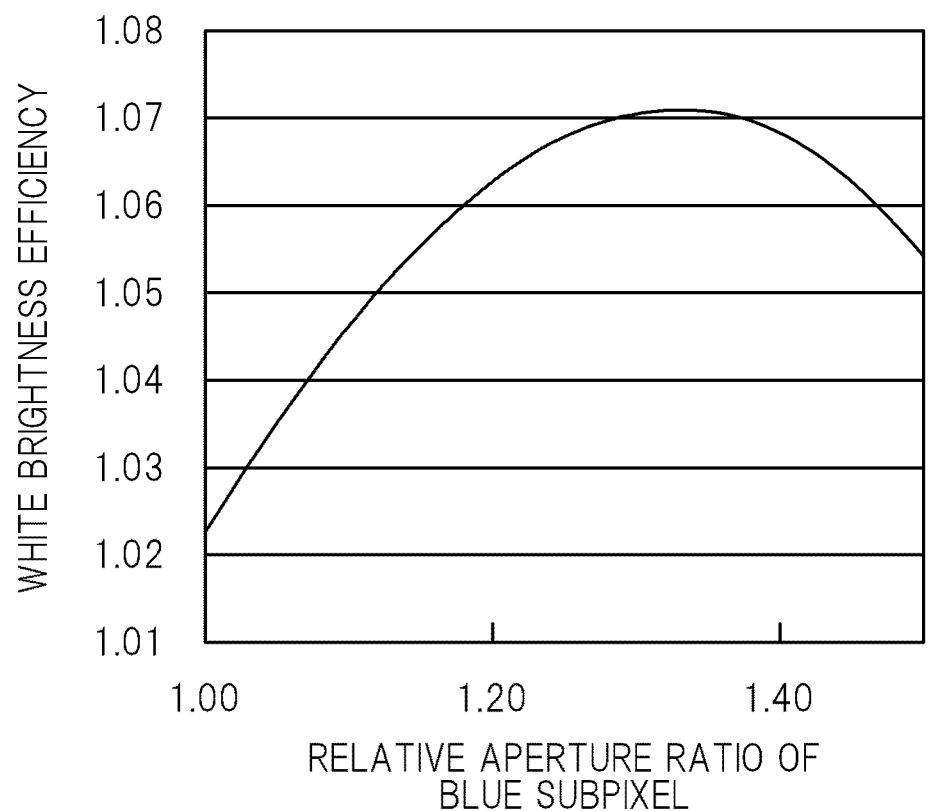
FIG. 6 is a graph showing the relationship between a relative aperture ratio of the blue subpixel and the white brightness efficiency of a liquid crystal display part.

FIG. 6 is a graph showing the relationship between a relative aperture ratio of the blue subpixel 20b and the white brightness efficiency of the liquid crystal display part 62 obtained from the relationships shown in shown in FIG. 4 and FIG. 5. The white brightness efficiency taken on an axis of ordinates in FIG. 6 is a relative value with reference to the white brightness in a state where a ratio among aperture ratios of three subpixels is set to 1:1:1. FIG. 6 shows that there exists a point where the white brightness efficiency becomes maximum when the aperture ratio $a_B$ of the blue subpixel 20b is changed in a state where the aperture ratio $a_G$ of the green subpixel 20g is fixed to 1.1. The aperture ratio $a_B$ of the blue subpixel which gives such a maximum point is set based on a balance between the light emission efficiency which is increased corresponding to lowering of a color temperature of the backlight 18 (FIG. 4) and the transmissivity of the pixel which is decreased corresponding to the increase of the aperture ratio $a_B$ of the blue subpixel (FIG. 5).

In this embodiment, the backlight 18 is a CCFL which uses YOX as a red phosphor, LAP as a green phosphor and SCA as a blue phosphor respectively. Here, YOX is $Y_2O_3$:$Eu^{3+}$, LAP is $LaPO_4$:$Tb^{3+}$, and SCA is $(Sr, Ca)_{10}(PO_4)_6Cl_2$:$Eu^{2+}$. In FIG. 6, a mixing ratio of the above-mentioned phosphors of the backlight 18 is adjusted such that the pixel is displayed in white (color temperature: 10000K). The white brightness efficiency becomes maximum when the aperture ratio $a_B$ of the blue subpixel 20b is 1.3 with respect to the backlight 18.

Accordingly, in the liquid crystal display device 2 of this embodiment, a ratio $a_R:a_G:a_B$ among aperture ratios of the red subpixel 20r, the green subpixel 20g and the blue subpixel 20b is set to 0.6:1.1:1.3 so that the backlight is colored in warm color so as to cancel coloring in cold color due to the relative aperture ratio, whereby the white brightness efficiency can be maximized with predetermined power consumption. Due to such a constitution, the white brightness efficiency can be enhanced by 7% compared to the constitution where the relative aperture ratio of three subpixels is 1:1:1.

The above-mentioned phosphors used in the CCFL constituting the backlight 18 of this embodiment are exemplified as one example, and the present invention is also applicable to a fluorescent tube which uses other phosphors, and the white brightness efficiency can be maximized by adjusting a ratio among aperture ratios of three subpixels.

Corresponding to the difference in aperture ratio among the subpixels which constitute the pixel, areas of the pixel electrodes 32 arranged in the respective subpixels also differ from each other. Accordingly, along with the increase of the aperture ratio, the capacity 60 between the pixel electrode 32 and the common electrode 30 is also increased. To cope with such a situation, in the liquid crystal display device 2 of this embodiment, as described previously, the larger the area of the pixel electrode 32 in the subpixel, the larger the ratio W/L between the gate width W and the gate length L of the TFT 28 is set in the subpixel. That is, the size of the TFT 28 defined by the ratio W/L is set such that the size ratio among the red subpixel 20r, the green subpixel 20g and the blue subpixel 20b takes a value corresponding to the ratio of aperture ratios $a_R:a_G:a_B$. Accordingly, the larger the aperture ratio of the subpixel, the larger electric current which the TFT 28 can supply to the capacity 60 becomes.

The subpixels which differ in color are arranged in the row direction in the liquid crystal display part 62, and these subpixels are simultaneously selected by the common scanning line 50, and capacities 60 which are provided to the respective subpixels and differ from each other in magnitude are charged. In such an operation, the subpixels differ from each other in size of the TFT 28 as described above and hence, potentials of the respective pixel electrodes 32 are accurately set corresponding to an image signal applied to the signal line 51 within a common charge time. For example, even when a charge time is shortened, the large capacity 60 of the blue subpixel 20b can be speedily charged at a voltage corresponding to the image signal. Accordingly, for example, in a white display, the accuracy of voltages written in the respective subpixels 20r, 20g, 20b is enhanced thus enabling a display in a desirable white balance.

The liquid crystal display device according to the present invention can be used in an active-matrix-type liquid crystal display device, for example. Further, the liquid crystal display device according to the present invention is also applicable to a television receiver set, a car navigation system, a PC monitor, a notebook PC, a mobile phone, a DSC, a PDA and the like.

Although the invention made by inventors of the present invention has been specifically explained in conjunction with the embodiment of the present invention, the present invention is not limited to the embodiment of the present invention, and can be varied without departing from the gist of the present invention.

What is claimed is:

1. A liquid crystal display device comprising:
a light source which generates an irradiation light; and
a liquid crystal panel which includes a liquid crystal layer which is sandwiched between a pair of substrates, the liquid crystal panel being provided pixels, each consisting of red, green and blue subpixels, and controlling a transmission of the irradiation light; wherein
the irradiation light is generated from emission of phosphors of a fluorescent lamp as the light source;
an aperture ratio of the green subpixel in the each pixel of the liquid crystal panel is fixed to a desired value in advance;
aperture ratios of the red subpixel and the blue subpixel in the each pixel of the liquid crystal panel are determined such that, in a state where the aperture ratio of the green subpixel is fixed to the desired value, white brightness efficiency takes a maximum value which is set based on a balance between light emission efficiency which is increased corresponding to lowering of a color temperature of the light source and transmissivity of the pixel which is decreased corresponding to an increase of the aperture ratio of the blue subpixel;
the liquid crystal display device is an active-matrix-drive type liquid crystal display device in which each subpixel includes a thin film transistor which connects an individual electrode arranged in the subpixel to a signal line in response to a control voltage applied to a gate of the thin film transistor from a scanning line;
a ratio among areas of the individual electrodes of the red subpixel, the green subpixel and the blue subpixel in each pixel is set to a value corresponding to a ratio among the aperture ratios of the red subpixel, the green subpixel and the blue subpixel in each pixel; and
a size of the thin film transistor which is defined by a ratio W/L between a gate width W and a gate length L is set such that the ratio W/L of the size of the thin film transistor among the red subpixel, the green subpixel and the blue subpixel takes a value corresponding to the ratio among the aperture ratios.

2. The liquid crystal display device according to claim 1, wherein the areas of the individual electrodes of the red subpixel, the green subpixel and the blue subpixel satisfy the relationship of red<green<blue, and capacitors formed between a common electrode and each of the individual electrodes of the red, green and blue subpixels differ from each other in capacitance.

3. The liquid crystal display device according to claim 1, wherein the aperture ratio of only the green subpixel is fixed to the desired value in advance, and wherein the aperture ratios of both of the red subpixel and blue subpixel are determined in the state where the aperture ratio of only the green subpixel is fixed to the desired value.

* * * * *